US009555897B2

(12) United States Patent
Eline et al.

(10) Patent No.: US 9,555,897 B2
(45) Date of Patent: Jan. 31, 2017

(54) ROTARY-WING DRONE PROVIDED WITH A VIDEO CAMERA DELIVERING STABILIZED SEQUENCES OF IMAGES

(71) Applicant: PARROT, Paris (FR)

(72) Inventors: Pierre Eline, Arnouville les Gonesse (FR); Adrien Fontvielle, Paris (FR)

(73) Assignee: PARROT, Paris (FR)

( * ) Notice: Subject to any disclaimer, the term of this patent is extended or adjusted under 35 U.S.C. 154(b) by 51 days.

(21) Appl. No.: 14/680,833

(22) Filed: Apr. 7, 2015

(65) Prior Publication Data

US 2015/0298822 A1 Oct. 22, 2015

(30) Foreign Application Priority Data

Apr. 16, 2014 (FR) ..................................... 14 53416
Jul. 2, 2014 (FR) ..................................... 14 56302

(51) Int. Cl.
*B64D 47/08* (2006.01)
*G06T 1/00* (2006.01)
*B64C 39/02* (2006.01)
*H04N 5/232* (2006.01)

(52) U.S. Cl.
CPC ............ *B64D 47/08* (2013.01); *B64C 39/024* (2013.01); *G06T 1/0007* (2013.01); *H04N 5/2329* (2013.01); *H04N 5/23238* (2013.01); *H04N 5/23258* (2013.01); *H04N 5/23267* (2013.01); *B64C 2201/127* (2013.01)

(58) Field of Classification Search
CPC ........ B64D 47/08; H04N 5/232; B64C 39/024
USPC ...................................................... 244/175
See application file for complete search history.

(56) References Cited

U.S. PATENT DOCUMENTS

| 8,209,068 | B2 * | 6/2012 | Vos | ..................... | G05D 1/0816 244/181 |
| 8,761,966 | B2 * | 6/2014 | Zhu | ....................... | G05D 1/101 244/175 |
| 2009/0160957 | A1 | 6/2009 | Deng et al. | | |

OTHER PUBLICATIONS

Miyauchi R. et al.,"Compact Image Stabilization System Using Camera Posture Information", Journal of Field Robotics, vol. 25, No. 4-5, 2008, pp. 268-283, XP002734543.
Shiroma N. et al., "Compact Image Stabilization System for Small-Sized Humanoid", Robotics and Biomimetics, 2008, Ribio 2009, IEEE International Conference on, IEEE, Feb. 22, 2009, pp. 149-154, XP031465585.

(Continued)

*Primary Examiner* — Brian M O'Hara
*Assistant Examiner* — Keith L Dixon
(74) *Attorney, Agent, or Firm* — Haverstock & Owens LLP

(57) ABSTRACT

The drone (10) comprises a camera with a hemispherical-field lens of the fisheye type pointing to a fixed direction (Δ) with respect to the drone body. A capture area (36) of reduced size is extracted from the image formed by this lens (42), the position of this area being function of the signals delivered by an inertial unit measuring the Euler angles characterizing the attitude of the drone with respect to an absolute terrestrial reference system. The position of this area is dynamically modified in a direction (44) opposite to that of the changes of attitude (38) of the drone detected by the inertial unit. The raw pixel data are then processed to compensate for the geometric distortions introduced by the fisheye lens in the image acquired in the region of the capture area.

8 Claims, 10 Drawing Sheets

(56) References Cited

OTHER PUBLICATIONS

Kim et al., "Real-Time Implementation of Airborne Inertial-Slam", Robotics and Autonomous Systems, Elsevier Science Publishers, vol. 55, No. 1, Nov. 22, 2006, pp. 62-71, XP005777402.
Gurtner A. et al., "Investigation of Fish-Eye Lenses for Small-UAV Aerial Photography", IEE Transaction on Geoscience and Remote Sensing, vol. 47, No. 3, Mar. 1, 2009, pp. 709-721, XP011250695.
Peter Corke et al., "An Introduction to Intertial and Visual Sensing", International Journal of Robotics Research, vol. 26, No. 6, Jun. 1, 2007, XP055089535.
Ryo Miyauchi et al., "Development of Omni-Directional Image Stabilization System Using Camera Posture Information", Robotics and Biommetics, IEEE International Conference Dec. 15, 2007, XP031252928.

* cited by examiner (a)

(b)

ROTARY-WING DRONE PROVIDED WITH A VIDEO CAMERA DELIVERING STABILIZED SEQUENCES OF IMAGES

The invention relates to the rotary-wing drones such as quadricopters and the like.

Such drones are provided with multiple rotors servo-controlled by respective motors that can be controlled in a differentiated manner so as to pilot the drone in attitude and speed.

A typical example of such a drone is the AR.Drone 2.0 of Parrot SA, Paris, France, which is a quadricopter equipped with a series of sensors (accelerometers, three-axis gyrometers, altimeter), a front camera capturing an image of the scene towards which the drone is directed, and a vertical-view camera capturing an image of the overflown ground.

The documents WO 2010/061099 A2 and EP 2 364 757 A1 (Parrot SA) describe such a drone, as well as the principle of piloting the latter through a phone or a multimedia player with a touch screen and an integrated accelerometer, for example a cellular phone of the iPhone type or a multimedia tablet of the iPad type (registered trademarks of Apple Inc., USA). Such devices include the various control elements required for the detection of the piloting commands and the bidirectional exchange of data with the drone via a wireless link of the Wi-Fi (IEEE 802.11) or Bluetooth (registered trademark) local network type. They are furthermore provided with a touch screen displaying the image captured by the front camera of the drone, with in superimposition a certain number of symbols allowing the activation of commands by simple contact of the user's finger on this touch screen.

The front video camera of the drone can be used for a piloting in "immersion mode", i.e. where the user uses the image of the camera in the same way as if it were himself on board the drone. It may also serve to capture sequences of images of a scene towards with the drone heads. The user can hence use the drone in the same way as a camera or a camcorder that, instead of being held in hand, would be carried by the drone. The images picked up can be recorded, then broadcast, put online on video sequence hosting websites, sent to other internauts, shared on social networks, etc.

These images being intended to be recorded and communicated, it is desirable that they have the least possible defects, in particular defects resulting from spurious movements of the drone, that will cause untimely oscillations and jitters of the image captured by the camera.

In particular, with the camera pointing in the main direction of the drone, any movement about the pitch axis (or the yaw axis), which is perpendicular to the axis of the camera, will produce in the image vertical (respectively, horizontal) oscillations strongly damaging the readability and quality of the image captured. Likewise, any movement about the roll axis (axis of the camera) will cause a rotation of the image in one direction or the other, harming the readability thereof.

Now, the displacements of a rotary-wing drone such as a quadricopter, whether it is controlled by the user or servo-controlled by an automatic pilot, mainly result from tilting movements about pitch axis (front/rear displacements) or roll axis (left/right displacements), which are inherent to the very principle of operation of such a drone.

More precisely, if the drone is controlled so as to tilt or "dive" downward (inclination about a pitch angle), it will move forward with a speed that is all the more high that the inclination angle is great. Conversely, if it is controlled so as to "nose up" in the opposite direction, its speed will progressively decrease, then will invert, going back rearward. In the same way, for a command of inclination about a roll axis, the drone will lean to the right or to the left, causing a linear displacement in horizontal translation towards the right or towards the left.

Any linear displacement of the drone forward or rearward or aside involves a tilting of the drone, and hence a corresponding effect of shifting, rotation, oscillation . . . of the image acquired by the camera.

Those disturbances may be acceptable in an "immersion piloting" configuration insofar as they are part of the "user experience".

On the other hand, if the matter is to use the drone as a mobile video camera to capture sequences that will be recorded and rendered latter, these spurious movements are extremely disturbing, with in the image a misaligned and unstable horizon, going up and down in the image as the drone speeds up or slows down, as well as spurious rotations and other various artefacts.

The EP 2 613 214 A1 (Parrot) describes a method for piloting a drone so as to take images according to a mode selected by the user, such as front or lateral travelling, panoramic or camera boom, defining a trajectory to impart to the drone. Once the drone stabilized on the prescribed trajectory, the video imaging is activated and the trajectory is stabilized by an open-loop control avoiding the oscillations inherent to a feedback-loop control. However, the matter is in this case to stabilize a trajectory by avoiding the spurious oscillations about a set-point by modifying the operation of the drone attitude control loops when the movement imparted to the latter is a uniform rectilinear translational movement or a uniform rotational movement. The matter is not to compensate for the displacements of the image resulting from the tilting movements of the drone during speeding up or slowing down phases during front/rear and/or left/right displacements.

Various solutions have been proposed to ensure the compensation for such displacements in the image.

A mechanical solution consists in mounting the camera in a cradle linked to the drone body by a Cardan suspension motorized and servo-controlled so as to compensate for the tilting movements of the drone. This solution has several advantages, in particular stabilizing the image upstream from its capture and permitting a great amplitude of angle compensation. On the other hand, it involves a complex and heavy mechanical system (this is particularly penalizing for a flying object), and the efficiency of the compensation is limited by the maximum acceleration and the speed of the servo-control motors used.

Another technique, called OIS (Optical Image Stabilization) consists in displacing in real time optical elements of the camera lens, or of the sensor in the focal plane. The stabilization is, here again, operated upstream from the image capture, and this system involves only a very low space requirement. On the other hand, the optical design is complex, and the maximum amplitude of angle compensation is limited to a few degrees, with moreover a sufficient time of response to compensate for the effects of taking an image by freehand, but too long to compensate for the very abrupt movements of a moving drone.

Finally, the so-called EIS (Electronic Image Stabilization) technique consists in acquiring on the sensor a fixed area of greater size than the capture area that will be used. The compensation is operated by a translation of the capture area to the acquisition area, in the opposite direction with respect to the movement to be compensated for, the sensor transmitting only a sub-part corresponding to the stabilized image. The implementation of such a compensation is simple. On the other hand, the amplitude of compensation is limited by the ratio between the size of the capture area and that of the acquisition area, i.e. the effective size of the sensor used.

Concretely, the maximum amplitude of angle compensation is limited to a few degrees.

The following articles:

Miyauchi R et al., "Compact Image Stabilization System Using Camera Posture Information", *Journal of Field Robotics*, Vol. 25, No 4-5, 2008, pp. 268-283 (2008), and Miyauchi R et al., "Development of Omni-Directional Image Stabilization System Using Camera Posture Information", *Proceedings of the 2007 IEEE International Conference on Robotics and Biomimetics*, Dec. 15-18, 2007, pp. 920-925, propose to apply such an EIS technique to the image captured by a camera provided with a hemispherical-field lens of the "fisheye" type, i.e. covering a field of about 180°. The raw image is acquired in totality (which is possible in real time because it is a low-resolution CCD sensor), subjected to a rectifying process (to compensate for the fisheye distortions), then a dynamic windowing process as a function of the movements of the robot carrying the camera.

The article of Shiroma N et al., "Compact Image Stabilization System for Small-Sized Humanoid", *Proceedings of the 2008 IEEE International Conference on Robotics and Biomimetics*, Feb. 21-26, 2009, pp. 149-154 describes a comparable technique of electronic stabilization of the image captured by a remote-controlled robot, with the same limitations and drawbacks.

These image stabilization techniques are however possible only because the camera is a camera with a low-resolution CCD sensor (640×480 pixels, i.e. 0.3 Mpixel). On the other hand, they would be inapplicable to the stabilization of a useful image of HD quality (1920×1080 pixels, i.e. 2 Mpixels), itself windowed on a very-high-resolution raw fisheye image, for example the image formed on a sensor of resolution 14 Mpixels (4608×3288 pixels). In these conditions, if the totality of the raw image were transferred to be processed, this would correspond to a flow of pixel data of 14 Mpixels for each image, leading to a framerate of the order of 6 images per second (ips) at this resolution, which would be insufficient for a fluid video sequence, requiring a framerate close to 30 ips.

Moreover, the simple translation of an area of the image is not mathematically sufficient to compensate for a rotation of the camera, because it is not a real correction of the change of perspective induced by rotations.

Finally, it is a compensation by post-processing of the image data acquired by the sensor, which does not allow to compensate for certain effects such that the blurring by motion and the wobble (undulation of the image, of low amplitude and high frequency, caused by the vibrations of the motors of the drone).

The object of the invention is to propose a new technique of image capture by the camera of a drone, in particular of the quadricopter type, which makes up for the above-mentioned drawbacks and provides the following advantages:

compatibility with the delivery in real time of HD-resolution images as a fluid video stream;
great amplitude of angle compensation;
possibility to compensate for the very fast and high-acceleration displacements;
no increase of the space requirement or of the weight of the on-board elements;
great simplicity of implementation;
compensation of all the optical phenomena, including those involving a change of perspective induced by the rotations of the drone;
compensation of the effects of high amplitude and low frequency (jelly) and low amplitude and high frequency (wobble) undulations.

The invention proposes for that purpose a system applicable to a rotary-wing drone of a type known, for example, from the above-mentioned articles of Miyauchi, i.e. comprising:

a camera, including a hemispherical-field lens of the fisheye type pointing to a fixed direction with respect to the drone body, as well as a digital sensor acquiring the image formed by the lens and delivering raw pixel data;

image processing means, receiving as an input the raw pixel data and delivering as an output rectified pixel data, compensated for the geometric distortions introduced by the fisheye lens;

means for delivering as an output rectified pixel data, for transmission to a display or video-recording device;

an inertial unit, adapted to measure the Euler angles characterizing the attitude of the drone with respect to an absolute terrestrial reference system; and servo-control means, receiving as an input at least one Euler angle delivered by the inertial unit, and adapted to window the pixel data delivered as an output by the delivery means as a function of changes of attitude of the drone detected by the inertial unit.

Characteristically of the invention:

the digital sensor is a scanning sensor delivering line by line said raw pixel data;

the drone further includes extraction means, receiving as an input a selection signal defining over the sensor extent the position of a capturing area of reduced size, and delivering as an output said raw pixel data, which correspond to the reduced-size capture area;

the servo-control means are means adapted to dynamically modify said selection signal in an opposite direction with respect to that of a change of attitude of the drone detected by the inertial unit and characterized by a corresponding variation of said at least one Euler angle; and said image processing means receive as an input the raw pixel data delivered by the extraction means.

According to various advantageous subsidiary characteristics:

the servo-control means are adapted to modify the selection signal so that the pixel data delivered by the extraction means correspond to an image centred on the horizon, or centred on a fixed orientation with respect to the horizon;

the camera is mounted in the drone so that the frame scanning direction of the digital sensor is oriented parallel to the pitch angle of the drone;

said at least one Euler angle is a pitch angle of the drone, and the servo-control means are adapted to modify the selection signal so as to translate the capture area in a first direction, parallel to a main axis of the sensor;

said at least one Euler angle is a yaw angle of the drone, and the control means are adapted to modify the selection signal so as to translate the capture area in a second direction, perpendicular to said first direction;

the digital sensor is a scanning sensor delivering the pixel data line by line, and the image processing means are adapted to apply to each line of the sensor an additional correction to compensate for the relative displacements of pixels from one line to the following one, induced by rotations of the drone about a yaw, pitch and/or roll axis;

to operate this additional correction when the camera is a camera of the rolling shutter type delivering video data line by line, the camera and the gyrometric sensors of the inertial unit are piloted by a common clock, and the acquisition rate of the gyrometric sensors is a multiple of the video data delivery rate of the camera;

very advantageously, in this latter case, it is provided a physical circuit adapted to compare the signal delivered by the gyrometric sensors with the signal delivered by the camera, to determine the phase-shift value between these respective signals; and to apply this phase-shift value to the image processing means so as to trigger in a synchronous manner said additional correction applied to each line of the sensor to compensate for the relative displacements of pixels from one line to the following one.

An embodiment of the drone according to the invention will now be described, with reference to the appended drawings in which the same reference denote identical or functionally similar elements throughout the figures.

An exemplary embodiment will now be described.

Figure 1:
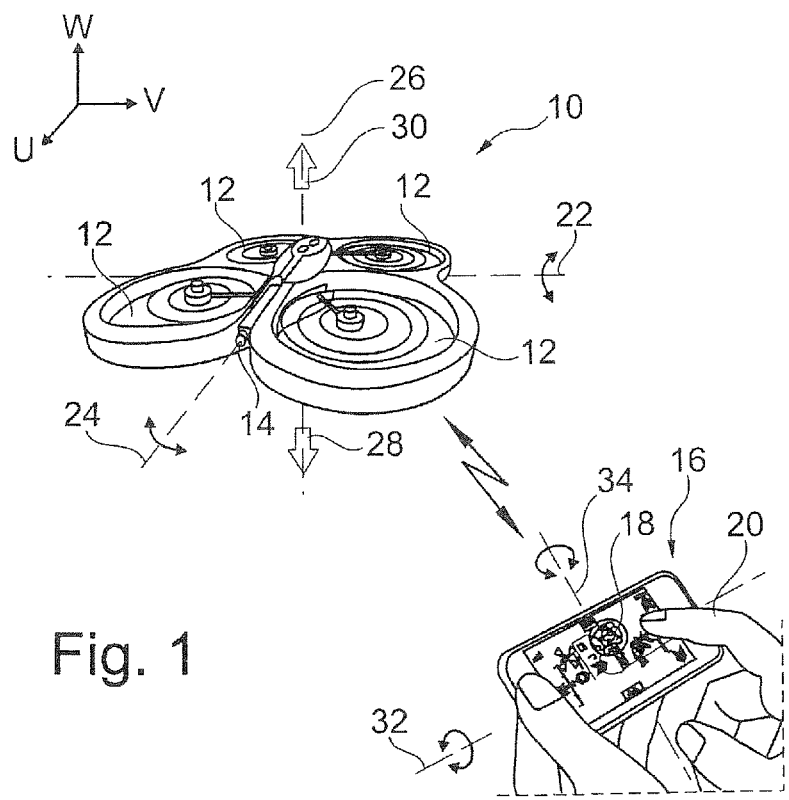
FIG. 1 is an overall view showing the drone and the associated remote-control device allowing the remote piloting thereof.

In FIG. 1, the reference 10 denotes generally a drone, which is for example a quadricoptere such as the model AR.Drone 2.0 of Parrot SA, Paris, France, described in particular in the above-mentioned WO 2010/061099 A2 and EP 2 364 757 A1.

The drone 10 includes four coplanar rotors 12 whose motors are piloted independently by an integrated navigation and attitude control system. It is provided with a first front-view camera 14 allowing to obtain an image of the scene towards which the drone is directed.

The drone also includes a second, vertical-view camera (not shown) pointing downward, adapted to capture successive images of the overflown ground and used in particular to evaluate the speed of the drone relative to the ground. Inertial sensors (accelerometers and gyrometers) allow to measure with a certain accuracy the angular speeds and the attitude angles of the drone, i.e. the Euler angles (pitch $\phi$, roll $\theta$ and yaw $\psi$) describing the inclination of the drone with respect of a horizontal plane of a fixed terrestrial reference system, it being understood that the two longitudinal and transverse components of the horizontal speed are closely linked to the inclination about the two respective pitch and roll axes. An ultrasound telemeter arranged under the drone moreover provides a measurement of the altitude relative to the ground.

The drone 10 is piloted by a remote-control device 16 provided with a touch screen 18 displaying the image on-board the front camera 14, with in superimposition a certain number of symbols allowing the activation of piloting commands by simple contact of the finger 20 of a user on the touch screen 18. The device 16 is provided with means for radio link with the drone, for example of the Wi-Fi (IEEE 802.11) local network type, for the bidirectional exchange of data from the drone 10 to the device 16, in particular for the transmission of the image captured by the camera 14, and from the device 16 to the drone 10 for the sending of piloting commands.

The remote-control device 16 is also provided with inclination sensors allowing to control the drone attitude by imparting to the device corresponding inclinations about the roll and pitch axes (reference can be made to the above-mentioned WO 2010/061099 A2 for more details about these aspects of the system). The piloting of the drone 10 consists in making it evolve by:

a) rotation about a pitch axis 22, to make it move forward or rearward;
b) rotation about a roll axis 24, to shift it to the right or to the left;
c) rotation about a yaw axis 26, to make the main axis of the drone pivot to the right or to the left—and hence also the pointing direction of the front camera 14; and
d) translation downward 28 or upward 30 by changing the gas control, so as to reduce or increase, respectively, the altitude of the drone. When these piloting commands are applied by the user from the remote-control device 16, the commands a) and b) of pivoting about the pitch axis 22 and roll axis 24 are obtained by inclinations of the device 16 about its longitudinal axis 32 and transverse axis 34, respectively: for example, to make the drone move forward, it is just needed to incline the remote-control device 16 forward by tilting it about the axis 32, to move it aside to the right, it is just needed to incline the remote-control device 16 by tilting it to the right about the axis 34, etc. The commands c) and d) result from actions applied by contact of the user's finger 20 on corresponding specific areas of the touch screen 18.

The drone has also an automatic and autonomous system of hovering flight stabilization, activated in particular as soon as the user removes his finger from the touch screen of the device, or automatically at the end of the take-off phase, or in case of interruption of the radio link between the device and the drone. The drone then switches to a lift condition in which it will be automatically immobilized and stabilized in this fixed position, without any intervention of the user.

Figure 2A:
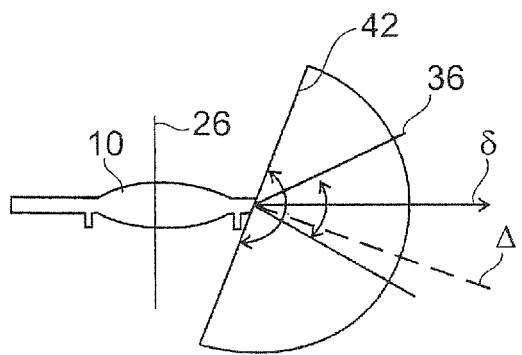
FIGS. 2a and 2b illustrate the modifications of the camera sight directions caused by a tilting forward of the drone, for example during a speeding up phase.

FIG. 2A schematically illustrates, in profile, the attitude of the drone when the latter is stationary, in a lift condition.

The field covered by a front camera 14 of the conventional type, for example a camera covering a field of 54° and whose sight axis δ is centred on the horizon is schematized in 36.

Figure 2B:
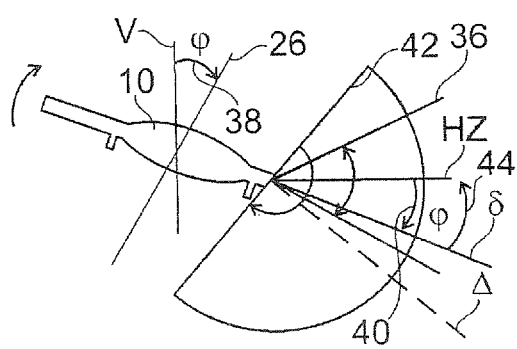

If, as illustrated in FIG. 2*b*, the drone moves forward with a non-zero horizontal speed, by design, the axis 26 of the drone will be inclined forward by an angle φ (pitch angle) with respect to the vertical V. This forward inclination, schematized by the arrow 38, involves an inclination of the same value, schematized by the arrow 40, of the axis δ of the camera with respect to the plane of the horizon HZ. It is hence understood that, over the evolutions of the drone, as the latter speeds up or slows down . . . , the axis δ oscillates permanently about the direction of the horizon HZ, which will result on the captured image in permanent upward and downward oscillation movements.

Comparably, if the drone moves aside to the right or to the left, this movement will be accompanied by a pivoting about the roll axis 24, which will result in the image in rotations in one direction or the other on the scene captured by the camera.

To compensate for this drawback, the invention proposes, instead of using a camera provided with a conventional lens, to provide this camera with a hemispherical-field lens of the "fisheye" type covering a field of about 180°, as schematized in 42 in FIG. 2*a*.

The image captured by the camera provided with this fisheye lens will of course be subjected to the same oscillation and rotation movements as a conventional camera but, characteristically of the invention, only a part of the field captured by this camera will be used by selection of a particular window, called a "capture window", corresponding to the angular sector 36 captured by a conventional camera. This capture area will be permanently displaced as a function of the movements of the drone as determined by the inertial central of the latter and in the opposite direction of the detected displacement.

In other words, a "virtual camera" is defined by extraction of a particular area of the hemispherical image, this area being dynamically displaced in the hemispherical image in the opposite direction of the movements of the drone so as to annihilate the oscillations that would otherwise be observed in the image.

Hence, in the case illustrated in FIG. 2*b*, where the drone dives downward by a pitch angle φ (arrow 38) with respect to the vertical V, the capture window will be displaced upward (arrow 44) by an angle of same value, hence bringing back towards the horizon HZ the central axis of the sector 36 of the "virtual camera".

As illustrated in the figures, insofar as the forward movements of the drone are more frequent than the rearward ones and that, on the other hand, the areas of interest (overflown ground) are located under the level of the drone rather than above the latter, it may be advantageous to incline downward the main axis Δ of the fisheye lens (for example by a site angle of −20°), so as to cover a greater number of configurations of evolution of the drone and to do so that the sector 36 corresponding to the capture area of the "virtual camera" always remains in the field 42 of the fisheye lens.

Figure 3:
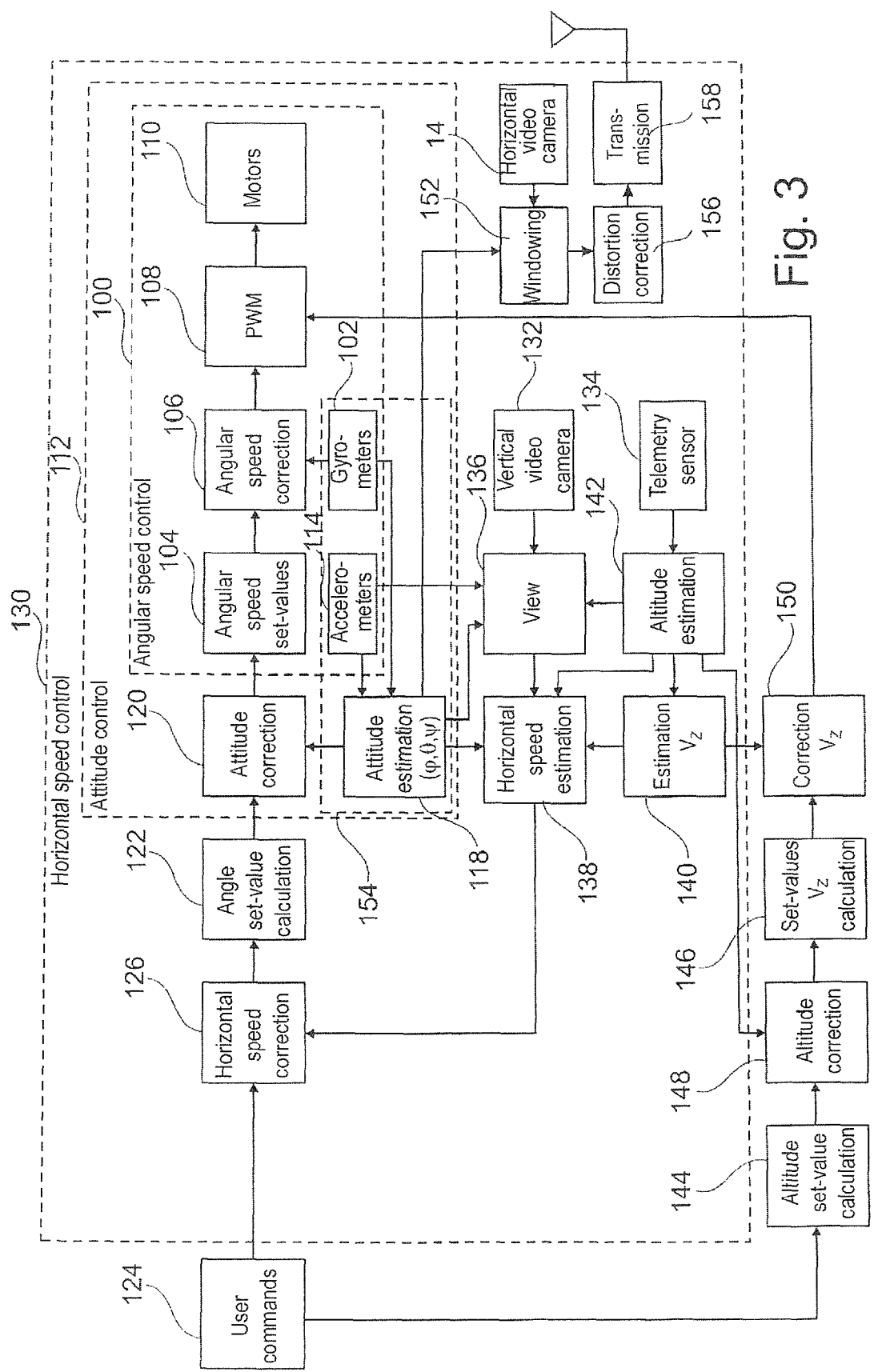
FIG. 3 is a block diagram of the different elements for servo-controlling and piloting the drone, as well as for correcting the displacements of the image according to the technique of the invention.

FIG. 3 is a block diagram of the different elements for servo-controlling and piloting the drone, as well as for correcting the displacements of the image according to the technique of the invention.

It will be noted that, although these diagrams are shown as interconnected circuits, the implementation of the different functions is essentially soft-ware-based, this representation being only illustrative.

Generally, as illustrated in FIG. 3, the piloting system involves several interlinked loops for controlling the horizontal speed, the angular speed of the drone attitude and the altitude variations, automatically or under the user's control.

The most central loop is the loop 100 for controlling the angular speed, which uses on the one hand the signals provided by gyrometers 102 and on the other hand a reference consisted by angular speed set-values 104. This information is applied at the input of an angular speed correction stage 106, which itself pilots a control stage 108 for the motors 110 so as to control separately the regime of the different motors to correct the angular speed of the drone by the combined action of the rotors driven by these motors.

The angular speed control loop 100 is interlinked with an attitude control loop 112, which operates based on indications provided by the gyrometers 102 and by accelerometers 114. The data coming from these sensors are applied to a stage 118 that produces an estimation of the real attitude of the drone, applied to an attitude correction stage 120. This stage 120 compares the real attitude of the drone to angle set-values generated by a circuit 122 based on commands directly applied by the user 124 and/or based on data generated internally by the automatic pilot of the drone via the horizontal speed correction circuit 126. The possibly corrected set-values applied to the circuit 120 and compared to the real attitude of the drone are transmitted by the circuit 120 to the circuit 104 to suitably control the motors.

Finally, a horizontal speed control loop 130 includes a vertical video camera 132 and a telemetry sensor 134 acting as an altimeter. A circuit 136 ensures the processing of the images produced by the vertical camera 132, in combination with the signals of the accelerometer 114 and of the attitude estimation circuit 118, to produce data allowing to obtain an estimation of the horizontal speeds along the two pitch and roll axes of the drone, by means of a circuit 138. The estimated horizontal speeds are corrected by the estimation of the vertical speed given by a circuit 140 and by an estimation of the altitude value, given by the circuit 142 based on the information of the telemetry sensor 134.

For the control of the vertical displacements of the drone, the user 124 applies commands to a circuit 144 for the calculation of attitude set-values, such set-values being applied to a circuit 146 for the calculation of ascensional speed set-values $V_z$ via the altitude correction circuit 148 receiving the estimated attitude value given by the circuit 142. The calculated ascensional speed Vz is applied to a circuit 150 that compares this speed set-value to the corresponding speed estimated by the circuit 140 and modifies consequently the motor control data (circuit 108) by increasing or reducing the rotational speed simultaneously on all the motors so as to minimize the difference between ascensional speed set-value and measured ascensional speed.

As regards more specifically the implementation of the invention, the front video camera 14 delivers raw video data (pixel data) applied to a windowing circuit 152 ensuring the selection of the useful pixels in a capture area, whose position depends on the attitude of the drone at a given instant, as determined by the inertial unit 154 (including the gyrometers 102, the accelerometers 114 and the attitude estimation circuit 118).

The video data extracted from the capture area are delivered to a circuit 156 for the correction of the geometric distortions introduced by the fisheye lens, so as to produce rectified video data, itself delivered to a transmitter circuit 158 ensuring the transmission of the video image to the remote-control device held by the user, in particular for display on the screen of this remote-control device and possible record of the video sequence.

Figure 4:
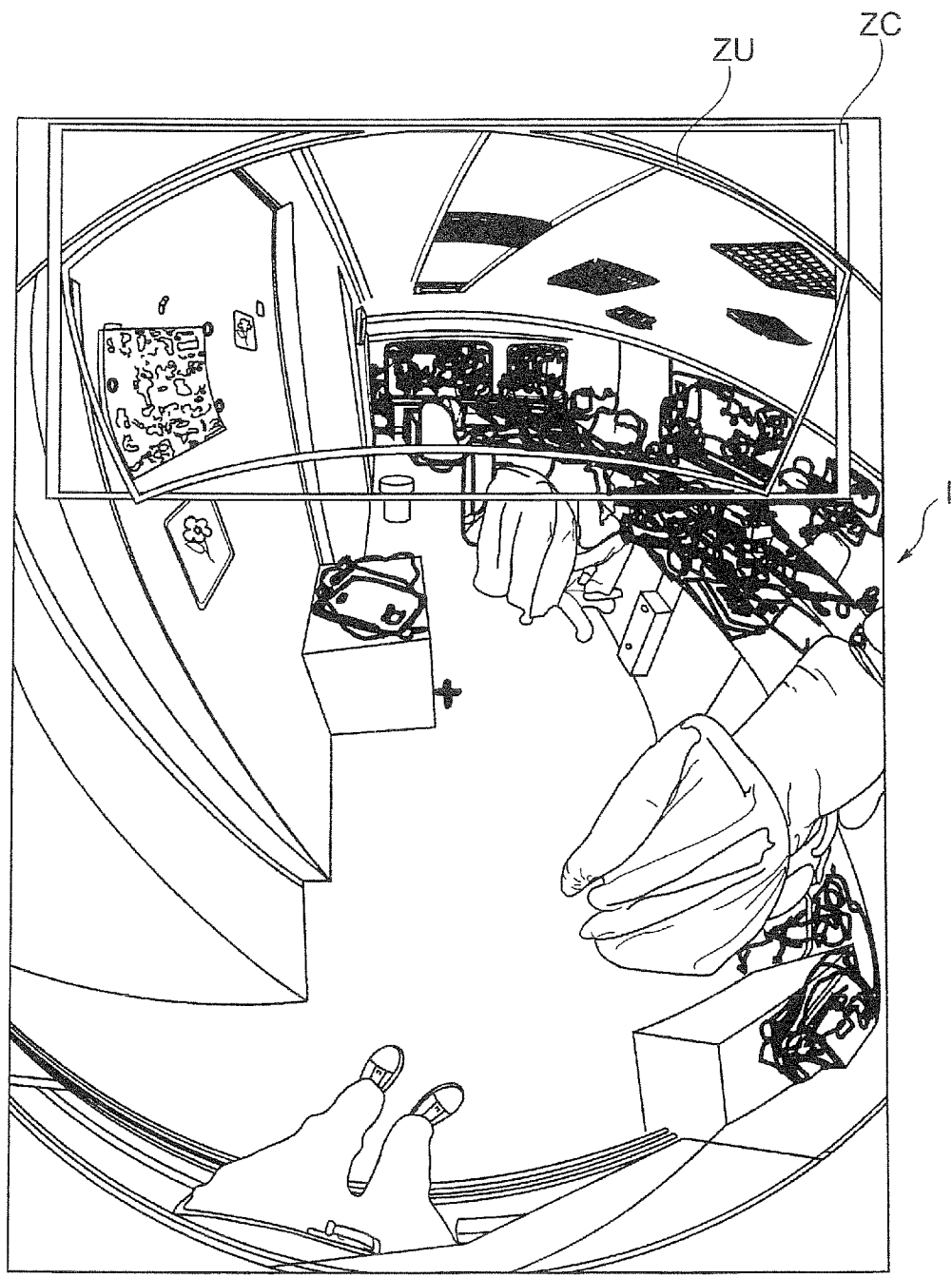
FIG. 4 is an example of an image formed on the sensor of the drone camera.

FIG. 4 shows an example of scene, as captured by the fisheye lens and detected on the sensor of the video camera.

As can be seen, this image I includes very high geometric distortions, inherent to the hemispherical or almost-hemispherical covering of the fisheye lens, which is rectified on the planar surface of the sensor.

Only a part of the image I produced by the fisheye lens is used. This part is determined as a function i) of the direction to which the "virtual camera" is pointed, ii) of the field of view of the latter (schematized in 36 in FIGS. 2*a* and 2*b*), and iii) of the width/height ratio thereof. A "capture area" ZC containing raw pixel data is hence defined, which includes the "useful area" ZU corresponding to the field of the virtual camera after compensation of the geometric distortions introduced by the fisheye lens.

It will be noted that it is not useful to capture the totality of the pixels of the image I formed on the camera sensor, but only a fraction of these latter (for the capture area ZC).

By way of example, if it is desired to obtain a final image of HD quality (1920×1080 pixels, i.e. 2 Mpixels for the useful area ZU), it is necessary to have at the beginning a fisheye image of very high resolution so as to be able to extract an HD view of good quality whatever the direction to which the virtual camera points, for example a sensor of resolution 14 Mpixels (4608×3288 pixels). In such conditions, if the totality of the image I were transferred for processing, this would correspond to a flow of pixel data of 14 Mpixels for each image, leading to a framerate of the order of 6 images per second (ips) at this resolution, which would be insufficient for a fluid video sequence (imposing a framerate close to 30 ips). Hence, only the really necessary pixel data of the capture area ZC are transferred, for example a capture window ZC of about 2 Mpixels, which may be refreshed at a rate of 30 ips with no particular difficulty. A high-resolution sensor may hence be chosen while keeping a high image flow rate.

Figure 5:
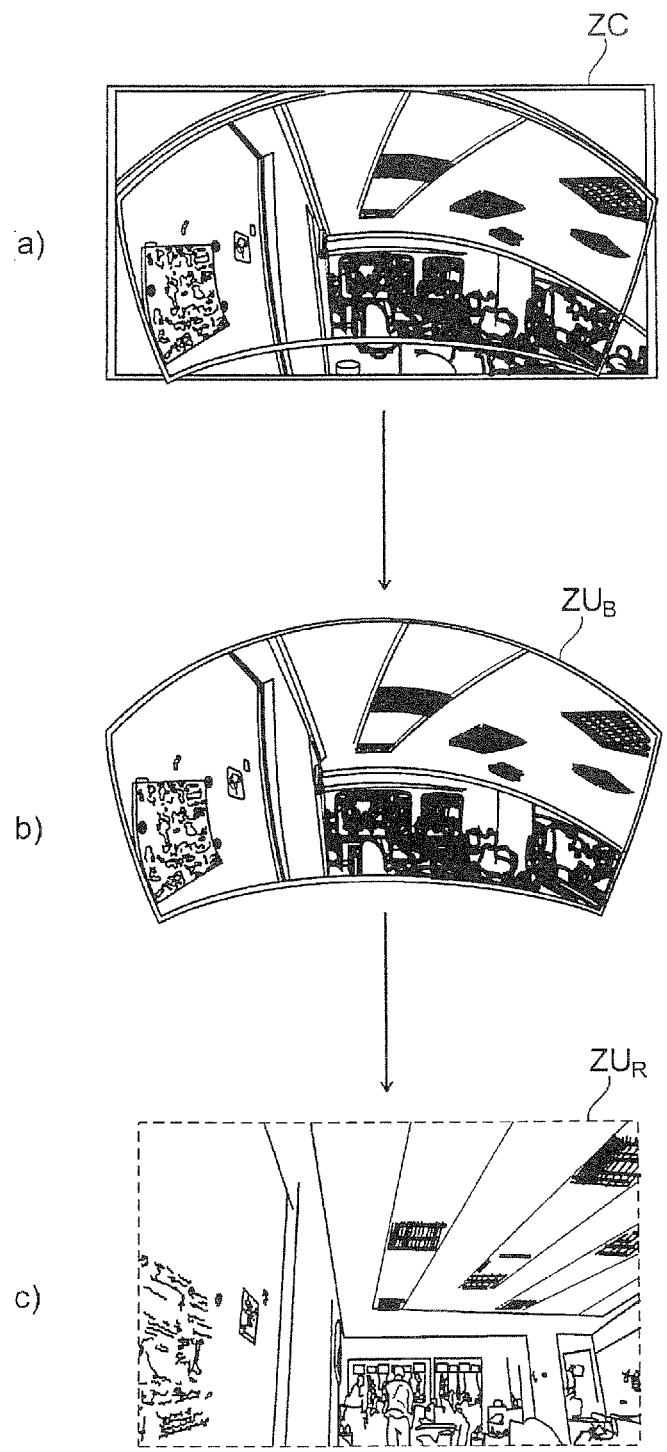
FIG. 5 illustrates the successive steps of windowing and correction of the distortions corresponding to the processing according to the invention applied to the image of FIG. 4.

In FIG. 5, are illustrated the different processes operated on the pixel data of the capture area ZC to obtain the final image, compensated for the geometric distortions.

Based on the pixel data transferred from the capture area ZC (FIG. 5*a*), the process extracts the pixel data from the raw useful area $ZU_B$ (FIG. 5*b*) and applies thereto a triangle meshing (technique known by itself), which will allow to rectify the image by stretching each triangle to give a rectified useful image $ZU_R$ (FIG. 5*c*) with rectified pixel data. In particular, the strongly curved horizontal lines of the fisheye image will be corrected so as to make them rectilinear and to produce an image corresponding to a natural vision, devoid of geometric distortions.

The way the capture window ZC is modified and displaced as a function of the orientation of the virtual camera will now be described with reference to FIGS. 6 to 10.

The windowing operation indeed involves displacing the capture area (acquisition window of the pixel data, transferred from the sensor to the processing circuits) during the transfer of the video stream, while keeping a high image flow rate.

Figure 6:
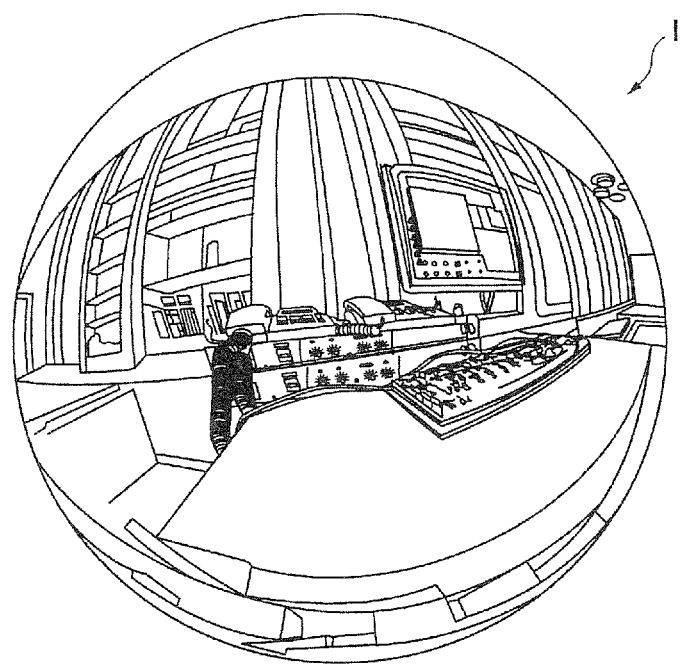
FIG. 6 illustrates another example of an image of a scene captured with the drone camera.
Figure 7:
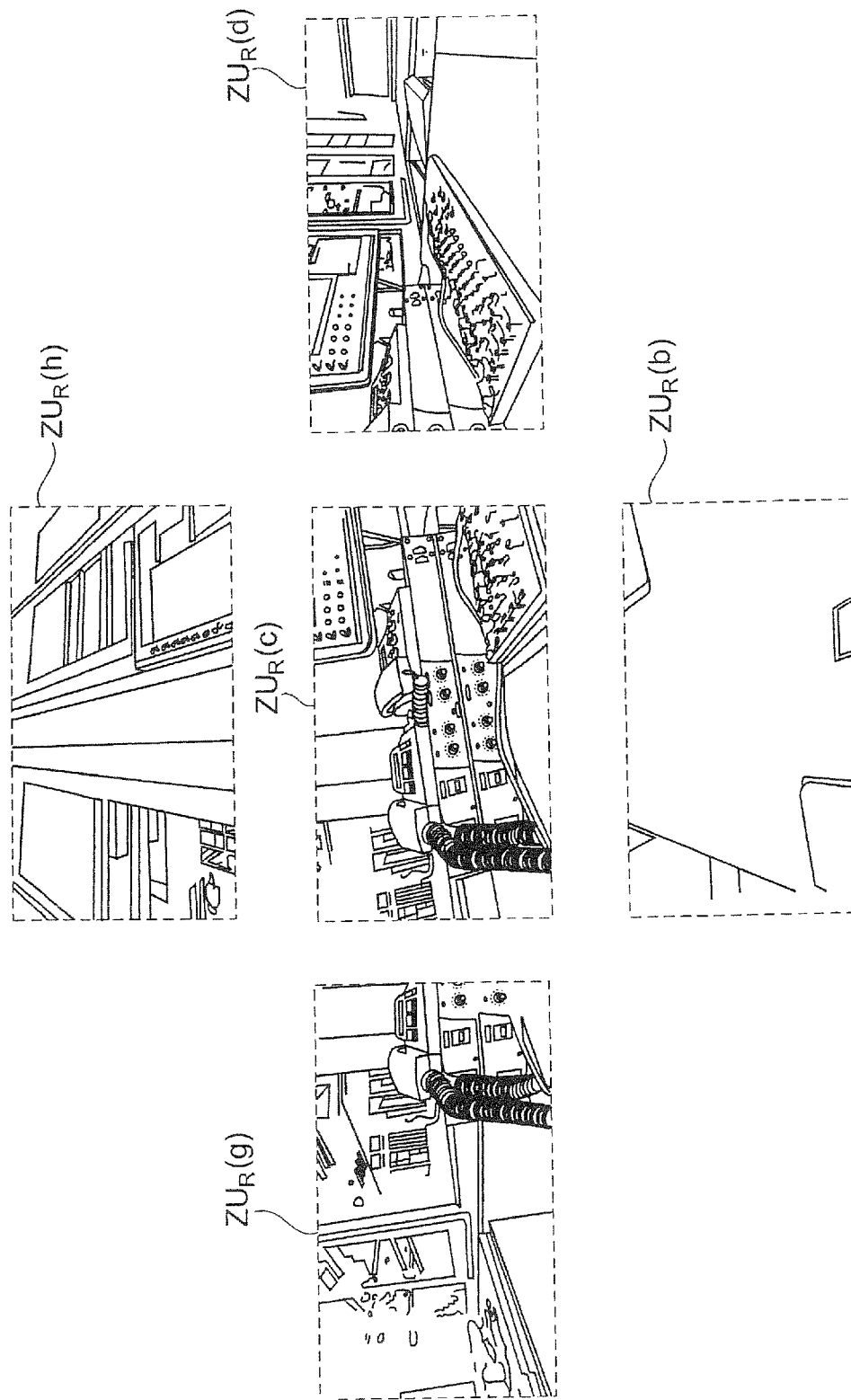
FIG. 7 illustrates various views that it is possible to extract from the whole image of FIG. 6, after windowing and correction of the distortions.

FIG. 6 gives an example of image I delivered by the camera fisheye lens that, as illustrated in FIG. 7, may produce after extraction of the capture area and correction of the geometric distortions various rectified images at the centre $ZU_R(c)$, at the top $ZU_R(h)$, at the bottom $ZU_R(b)$, on the left $ZU_R(g)$ or on the right $ZU_R(d)$, all coming from the same original image I.

Figure 8:
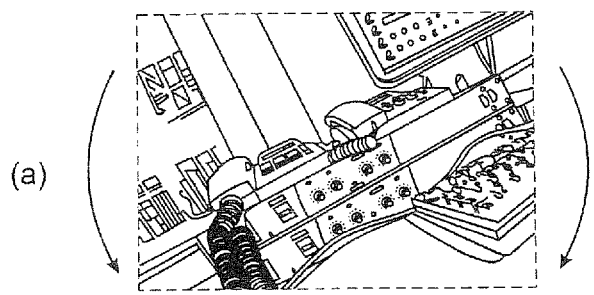
FIG. 8 illustrates the deformations applied to the central image illustrated in FIG. 7 in case of roll movement.
Figure 8:
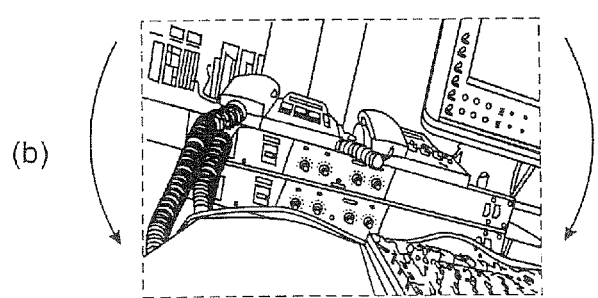

In the case of roll movements to the left or to the right, the image undergoes rotations as illustrated in a) and b) in FIG. 8. The correction of the image does not pose particular difficulty, insofar as it is just required to provide a slightly enlarged capture area and to apply, after the transfer of the pixel data, a correction of image by rotation in one direction or in the other, this correction having no noticeable incidence on the flow of pixel data transferred from the sensor to the processing circuit.

On the other hand, the rotations of the drone about the pitch axis 22 (when the drone dives forward or, on the contrary, noses up) introduce relatively significant displacements of the capture area ZC, upward or downward about a central position.

With a conventional configuration where the sensor is oriented in a "land-scope" format, these rotations cause displacements of the capture area parallel to the frame scanning direction of the sensor, which has for consequence to introduce significant drops of the pixel data transfer flow rate from the sensor to the processing circuits, with a significant risk of framerate drop: the change of the scanning sequence of the sensor to extract the capture area ZC may indeed lead, due to the slowing down of the pixel data flow rate, to a loss of certain images of the sequence, with a correlative decrease of the framerate liable to reach 50%.

Figure 9:
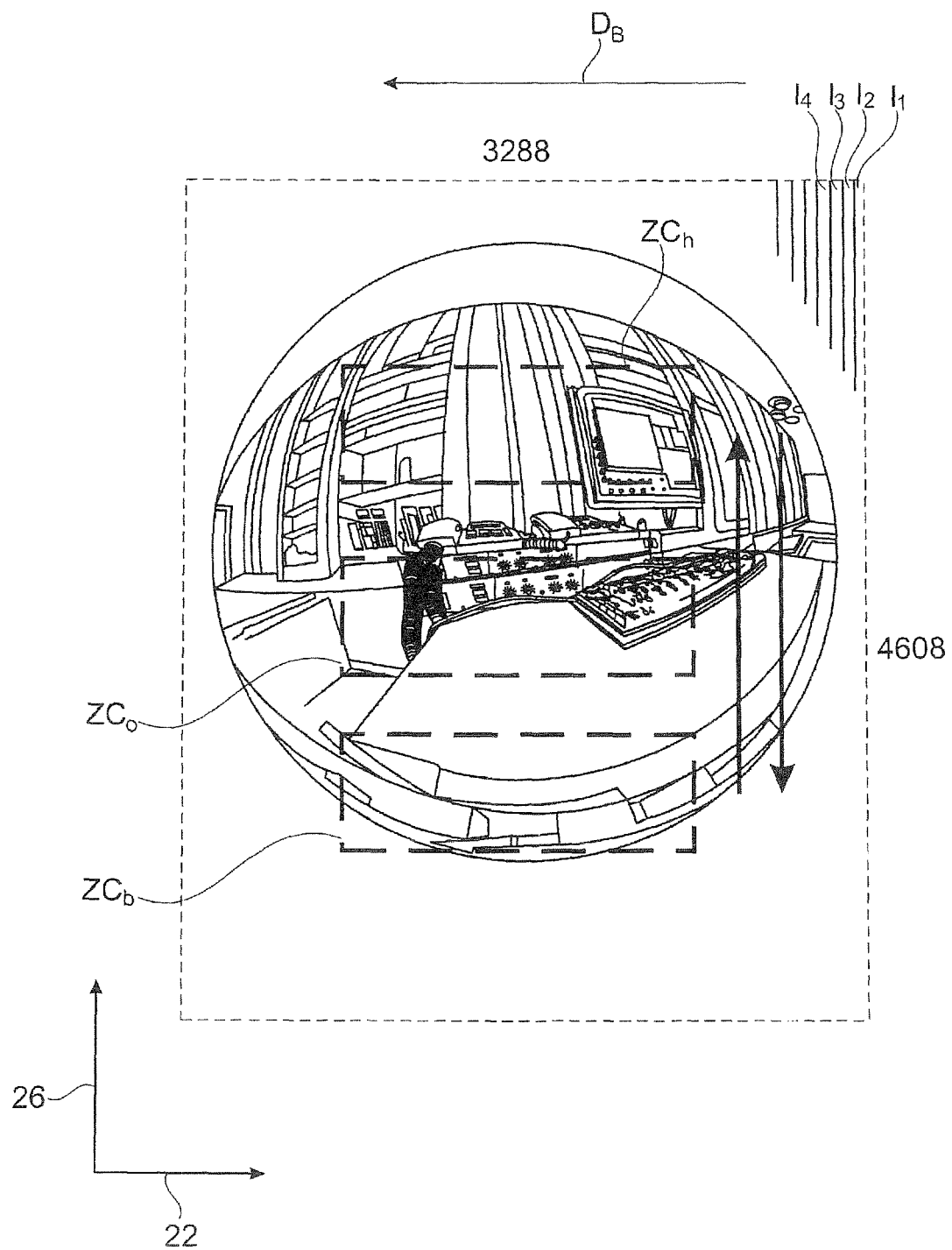
FIG. 9 illustrates how to optimally position the sensor to efficiently compensate for changes of attitude of the drone about its pitch axis.

Now, the oscillations about the pitch axis are the most frequent (forward/rearward moves of the drone, speeding up/slowing down phases . . . ). So, as illustrated in FIG. 9, to compensate for these displacements, it is chosen to turn the sensor by 90° with respect to a conventional orientation, i.e. to place it in a "portrait" configuration, so as to favour the displacements in a direction perpendicular to the frame scanning direction $D_B$ (the position of the scanning lines has been schematized in $l_1, l_2, l_3, l_4$ . . . ): from then on, the displacements of the capture areas linked to pitch movements ($ZC_h$ and $ZC_b$ about $ZC_0$) will have no impact on the flow rate of the pixel data delivered by the sensor. In other words, in this configuration, the sensor is oriented so that its frame scanning direction $D_B$ is parallel to the pitch axis 22 of the drone.

Figure 10:
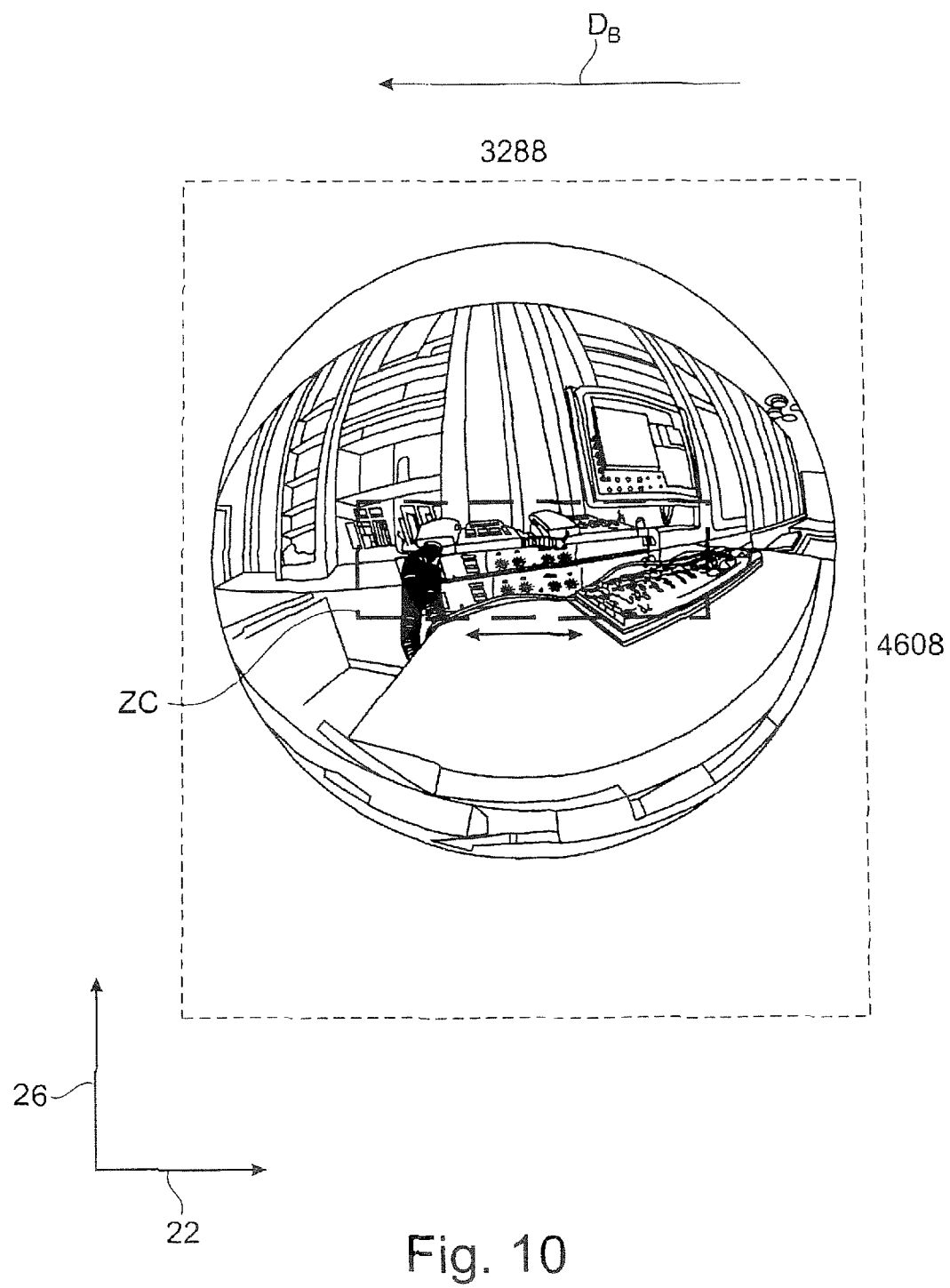
FIG. 10 is similar to FIG. 9, for rotations about a yaw axis.

FIG. 10 is similar to FIG. 9, for a movement of the capture area ZC consecutive to a movement of the drone about its law axis 26. If, as in the case of FIG. 9, the camera is oriented perpendicular to its "natural" positioning, these displacements of the capture area ZC will be oriented in the same direction as the scanning direction $D_B$ of the sensor. But, as the amplitudes of these variations are far lower than those corresponding to pitch movements, the incidence on the flow rate of the pixel data delivered by the sensor will be minimum, and the risk of losing images will be low.

Figure 11:
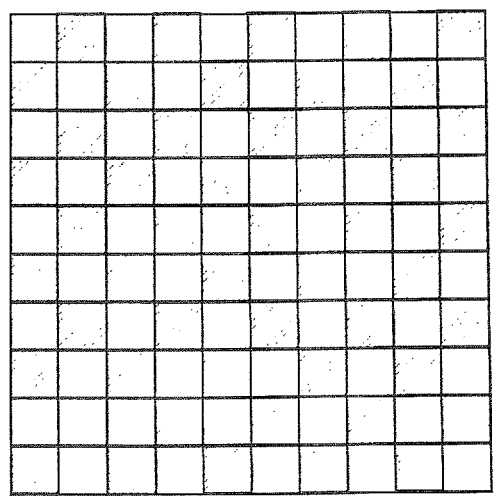
FIGS. 11, 12 and 13 illustrate the deformations of the wobble and jelly type which can be observed in the image of a checkerboard, and which may be compensated for during the correction of the distortions according to the teachings of the invention.
Figure 13:
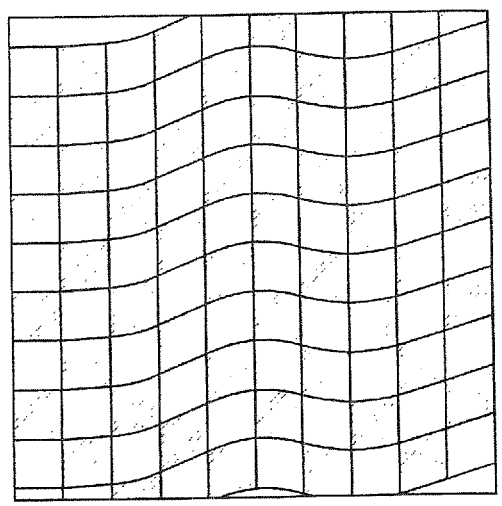
Figure 12:
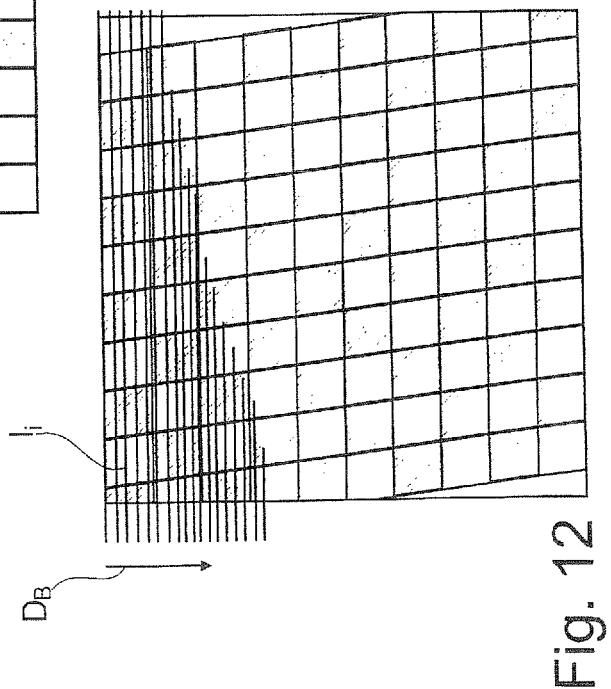

FIGS. 11, 12 and 13 illustrate the deformations of the wobble and jelly type, which can be observed in the image of a checkerboard, and which it is advisable to compensate for in addition to the geometric distortions of the fisheye lens.

The "jelly" effect, illustrated in FIG. 12, appears in presence of drone rotations of high amplitude but relatively low frequency. For example, in the case of a rotation of the drone of 100°/s and a video capture at 30 ips, between the top and the bottom of the image, the drone will have turned by 100×⅓₀=3.33°, which corresponds to a displacement of several pixels in the image (about a square of the checkerboard between the top and the bottom of the image in the example of FIG. 12). These artefacts are particularly cumbersome in mobile images, with a permanent and variable distortion of the straight lines.

To make up for this phenomenon, it is possible to adapt at each line $l_i$ of the image the processing of obtaining the useful area ZU during the step of re-projection and rectification of the capture zone ZC, this correction line by line allowing to cancel the artefact introduced by the fast rotation of the drone.

FIG. 13 illustrates another type of so-called "wobble effect" artefact, mainly caused by the vibrations of the motor: the wobble effect is due to high frequency and low amplitude oscillations, caused by the vibrations of the motors, unlike the jelly effect, which is a low frequency and high amplitude effect caused by the rotations of the drone when it moves. The wobble effect is mainly corrected by a suitable mechanical damping of the camera support, allowing to filter the vibrations of the motors. The residues of this mechanical filtering may be eliminated in that same way as for the jelly effect, using the gyrometers measurements and applying the correction line by line.

The mechanism allowing to compensate perfectly, line by line, the above-mentioned jelly and wobble effects, will now be described in relation with FIGS. 14 and 15.

These artefacts result from the fact that the camera is of the rolling shutter type (and not of the global shutter type), that is to say that the lines constituting the image are not acquired at the same time simultaneously for all the pixels of the image, but the ones after the others.

The movements of the drone or the vibrations occurring during the capture of an image generate that way within this image deformations that will not be the same from one line to the following one.

The correction line by line (correction "intra-image") of the jelly and wobble effects involves having means for acquiring the accurate attitude of the drone for each of these lines: to correct accurately each line, it is ideally required one attitude measurement per line, which is moreover synchronous with the sensor of the camera.

However, the gyrometers used by the drone do not allow to calculate the exact attitude of the drone at a rate corresponding to the duration of each line of the video sensor. It is however possible to perform an acquisition of the gyrometric data at a rate going up to 1 kHz, which allows to have several measurements per image and to interpolate the attitudes of the drone at each instant of acquisition of one line of the video sensor.

Figure 14:
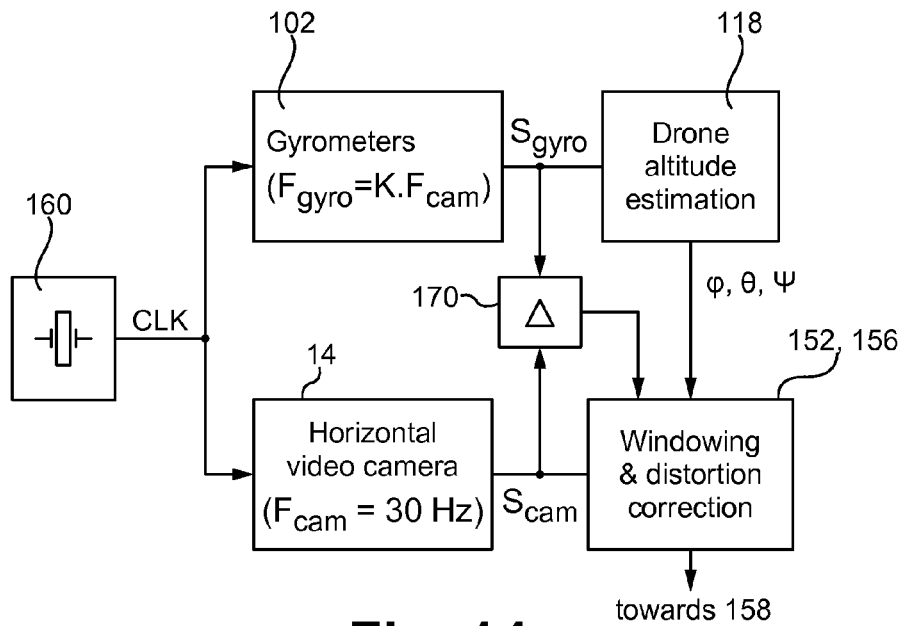
FIG. 14 illustrates, as a block diagram, the different elements contributing to the mechanism of synchronization between the video camera and the gyrometers.

FIG. 14 illustrates, as a block diagram, the different elements contributing to the synchronisation of the video camera and of the gyrometers: characteristically, the gyrometers 102 and the horizontal video camera 14 are piloted by a common clock circuit 160, and the respective operation rates of the gyrometers and of the camera are sub-multiples of the rate CLK of this clock.

In other words, the gyrometers 102 and the camera 14 are configured so that:

$$F_{gyro} = K \cdot F_{cam}$$

$F_{gyro}$ being the acquisition rate of the gyrometers (typically $F_{gyro}$=990 Hz), $F_{cam}$ being the image acquisition rate of the video camera (typically $F_{cam}$=30 Hz), and K being a positive integer (typically, K=33).

The fact that K is an integer and that the base clock is the same for the gyrometers and the camera ensures that there will always be K samples of the gyrometric signal $S_{gyro}$ per image $S_{cam}$, with no drift, the angle measurements always falling at the same time.

However, although this mechanism ensures that the signal $S_{gyro}$ delivered by the gyrometric sensor and the signal $S_{cam}$ delivered by the camera 14 are synchronous, it gives no guarantee about the phase concordance of these two signals.

Indeed, the video acquisitions and the gyrometric acquisitions are triggered by a software, and it is hence not certain that the two acquisitions start at the same time nor that the time interval separating the two starts are constant from one drone to another, or even from one piloting sequence to another for a same drone.

Figure 15A:
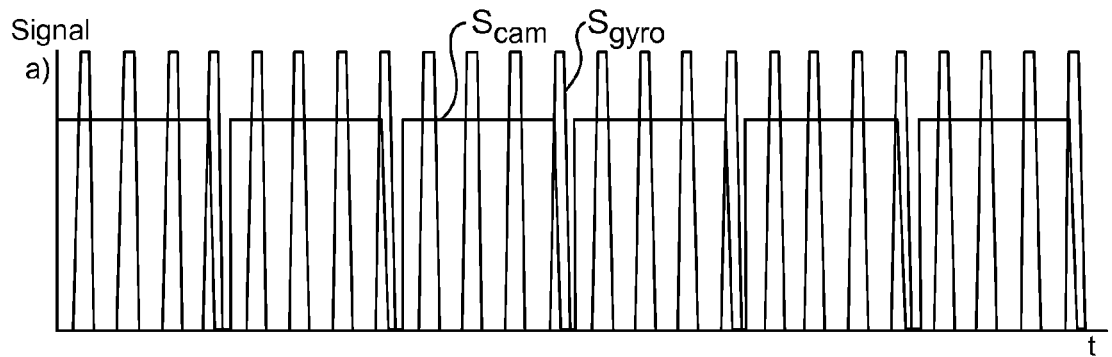
FIGS. 15a and 15b are timing diagrams showing the time relation between the signals delivered by the camera and by the gyrometers, for two different drones or for the same drone at two different moments, respectively.
Figure 15B:
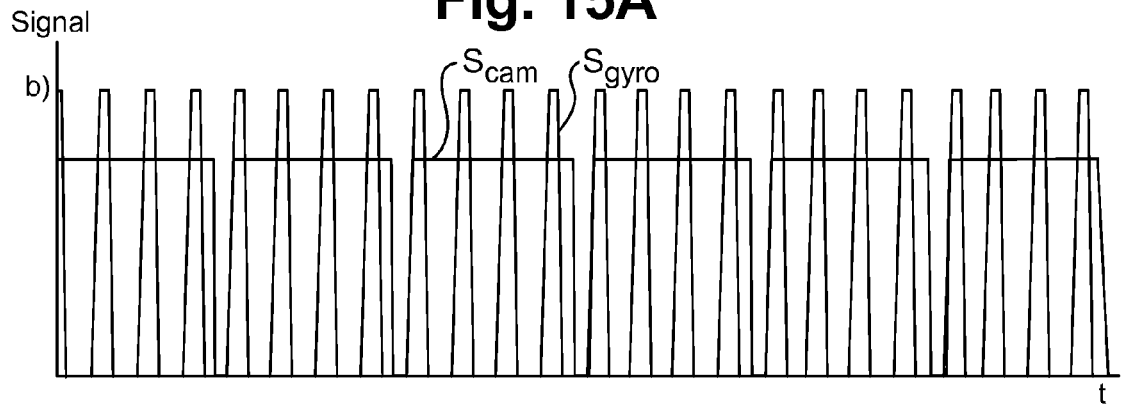

These signals $S_{cam}$ and $S_{gyro}$ have been illustrated in FIG. 15 in two different cases (a) and (b): for the video signal $S_{cam}$, a new line image is available at each descending front, and for the gyrometric signal $S_{gyro}$ the descending fronts also correspond to the availability of a new angular data.

Based on these time diagrams, it is observed that the gyrometric signal $S_{gyro}$ does not "slide" with respect to the video signal $S_{cam}$, which means that, when a new image is available, there is always the same time interval before the gyrometer delivers new data. On the other hand, this time interval varies from one drone to another, and a from one piloting sequence to another, because the gyrometric sensors have not been started at the same time as the video camera.

To guarantee a perfect synchronisation, the invention characteristically proposes to use a physical component (hardware) 170, which measures the time interval Δ between the gyrometric and video signals $S_{gyro}$ and $S_{cam}$ with a great accuracy. It will be noted that a single measurement is sufficient, because the clocks have been set so that they do not drift.

The two mechanisms that have been just described (common clock 160 and phase-shift measurement hardware circuit 170) allow to connect in time the gyrometric and video signals with a very high accuracy, to within a clock cycle.

The system clock 160 operating at several megahertz, this represents a few nanoseconds of error on the clamping between the video and gyrometric signals, which is very low and allows to operate an extremely accurate and efficient correction of the jelly and wobble effects.

On the other hand, in the absence of such mechanism, it would have been necessary to pick up by software the instant of delivery of each new data of the gyrometer and of each new image acquired. Such a method would be far less accurate and more irregular due to its sensitivity to the time of reaction of the system, and would provide only an accuracy of the order of 100 microseconds.

The invention claimed is:

1. A rotary-wing drone (10), comprising:
   a camera (14), including a hemispherical-field lens of a fisheye type pointing to a fixed direction (Δ) with respect to a drone body, as well as a digital sensor acquiring an image (I) formed by a lens and delivering raw pixel data;
   an image processing means (156), receiving as an input the raw pixel data and delivering as an output rectified pixel data, compensated for geometric distortions introduced by the fisheye lens;
   means (158) for delivering as an output rectified pixel data, for transmission to a display or a video-recording device;
   an inertial unit (154), adapted to measure Euler angles (ϕ,θ,ψ) characterizing an attitude of the drone body with respect to an absolute terrestrial reference system; and
   a control means (152), receiving as an input at least one Euler angle delivered by an inertial unit (154), and adapted to window the raw pixel data delivered as an output by a delivery means as a function of changes of attitude of the drone detected by the inertial unit, characterized in that:

the digital sensor is a scanning sensor delivering line by line said raw pixel data;

the drone further includes extraction means (152), receiving as an input a selection signal defining over the digital sensor a position of a capturing area (ZC) of reduced size, and delivering as an output said raw pixel data, which correspond to the capture area of reduced size;

a servo-control means (152) are means adapted to dynamically modify said selection signal in a direction opposite to that of a change of attitude of the drone detected by the inertial unit and characterized by a corresponding variation of said at least one Euler angle; and said image processing means (156) receive as an input the raw pixel data delivered by an extraction means.

2. The drone of claim 1, wherein the servo-control means are adapted to modify the selection signal so that the raw pixel data delivered by the extraction means correspond to an image centered on a horizon, or centered on a fixed orientation with respect to the horizon.

3. The drone of claim 1, wherein the camera is mounted in the drone so that a frame scanning direction ($D_B$) of the digital sensor is oriented parallel to a pitch angle (22) of the drone.

4. The drone of claim 1, wherein said at least one Euler angle is a pitch angle ($\phi$) of the drone, and the servo-control means are adapted to modify the selection signal so as to translate the capture area in a first direction, parallel to a main axis of the digital sensor.

5. The drone of claim 4, wherein said at least one Euler angle is a yaw angle ($\psi$) of the drone, and the servo-control means are adapted to modify the selection signal so as to translate the capture area in a second direction, perpendicular to said first direction.

6. The drone of claim 1, wherein the image processing means (156) are adapted to apply to each line ($l_i$) of the sensor an additional correction to compensate for the relative displacements of pixels from one line to the following one, induced by rotations of the drone about a yaw, pitch or roll axis.

7. The drone of claim 6, wherein:

the camera (14) is a camera of a rolling shutter type delivering video data line by line;

the camera (14) and gyrometric sensors (102) of the inertial unit (154) are piloted by a common clock (160); and an acquisition rate ($F_{gyro}$) of the gyrometric sensors (102) is a multiple (K) of a video data delivery rate ($F_{cam}$) of the camera (14).

8. The drone of claim 7, further comprising a hardware circuit (170) adapted to:

compare a signal ($S_{gyro}$) delivered by the gyrometric sensors (102) with the signal ($S_{cam}$) delivered by the camera (14);

determine a phase-shift value between these respective signals; and apply this phase-shift value to the image processing means (156) so as to trigger in a synchronous manner said additional correction applied to each line of the digital sensor to compensate for the relative displacements of the pixels from one line to the following one.

* * * * *

UNITED STATES PATENT AND TRADEMARK OFFICE
CERTIFICATE OF CORRECTION

| | | |
|---|---|---|
| PATENT NO. | : 9,555,897 B2 | Page 1 of 1 |
| APPLICATION NO. | : 14/680833 | |
| DATED | : January 31, 2017 | |
| INVENTOR(S) | : Pierre Eline and Adrien Fontvielle | |

It is certified that error appears in the above-identified patent and that said Letters Patent is hereby corrected as shown below:

In the Specification

Column 10 at Line 19; the term "land-scope" should read -- land-scape --.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*